United States Patent

Cook

[11] 4,053,187
[45] Oct. 11, 1977

[54] SINGLE GAIN SKID CONTROL VALVE AND SKID CONTROL SYSTEM
[75] Inventor: Robert D. Cook, Valencia, Calif.
[73] Assignee: Crane Co., Chicago, Ill.
[21] Appl. No.: 742,251
[22] Filed: Nov. 16, 1976
[51] Int. Cl.² ............................................. B60T 8/02
[52] U.S. Cl. .................................... 303/93; 303/117
[58] Field of Search ............... 303/113, 114, 115, 116, 303/117, 118, 119, 61–63, 68–69, 93, 94, 98, 112, 102, 10, 6 R; 188/181 A

[56] References Cited
U.S. PATENT DOCUMENTS

| 3,443,594 | 5/1969 | Frayer | 303/117 |
|---|---|---|---|
| 3,486,801 | 12/1969 | Frayer | 303/10 X |
| 3,635,531 | 1/1972 | Okamoto et al. | 303/116 X |
| 3,671,082 | 6/1972 | Stevens | 303/117 X |

Primary Examiner—Trygve M. Blix
Assistant Examiner—Douglas C. Butler
Attorney, Agent, or Firm—Henry L. Brinks

[57] ABSTRACT

A vehicle skid control system including a wheel speed transducer, skid control circuitry responsive to the transducer for generating a control current output and a skid control valve responsive to the control current for providing single-gain control in a skid control mode. The skid control valve includes a first stage for generating a control pressure which is controlled exclusively by the current output of the valve driver, which control pressure is representative of the threshold pressure which an input metered pressure should not exceed if a skid condition is to be avoided. The control valve further includes a second stage pressure balancing system responsive to the pressure for allowing the metered supply pressure to be applied to a brake port as long as the metered pressure does not exceed the first stage control pressure. When the metered pressure exceeds the control pressure the second stage becomes operative to modulate the brake port pressure in accordance with the control pressure completely independently of variations in the metered pressure as long as the metered pressure remains above the control pressure from the first stage, thereby providing the single gain characteristic in the skid control mode.

22 Claims, 5 Drawing Figures

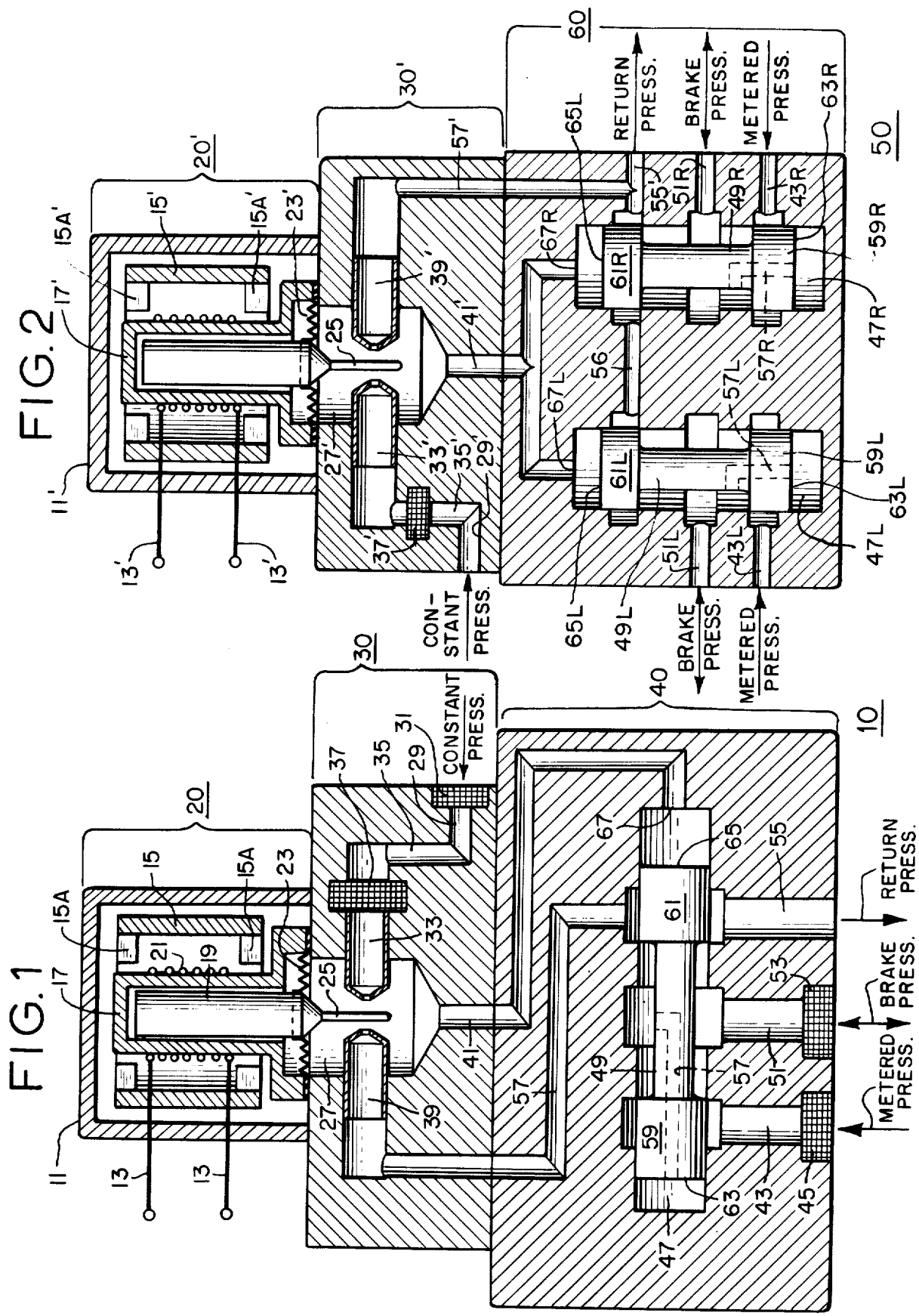

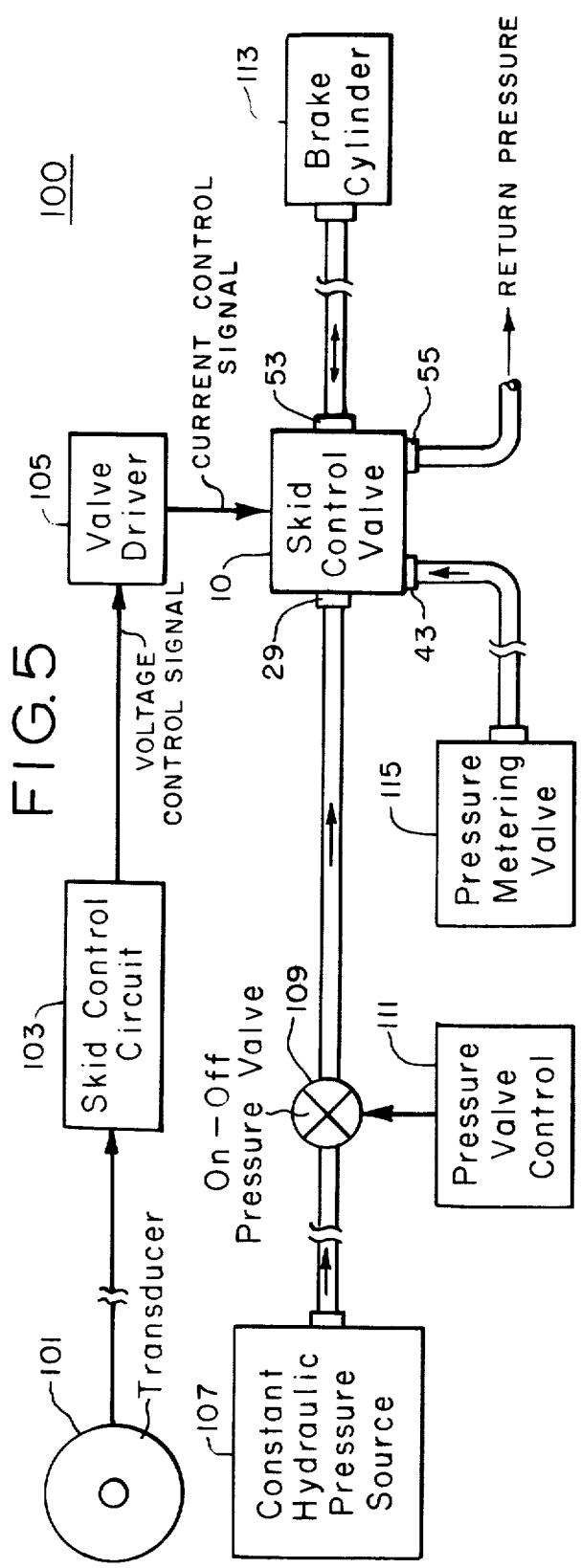
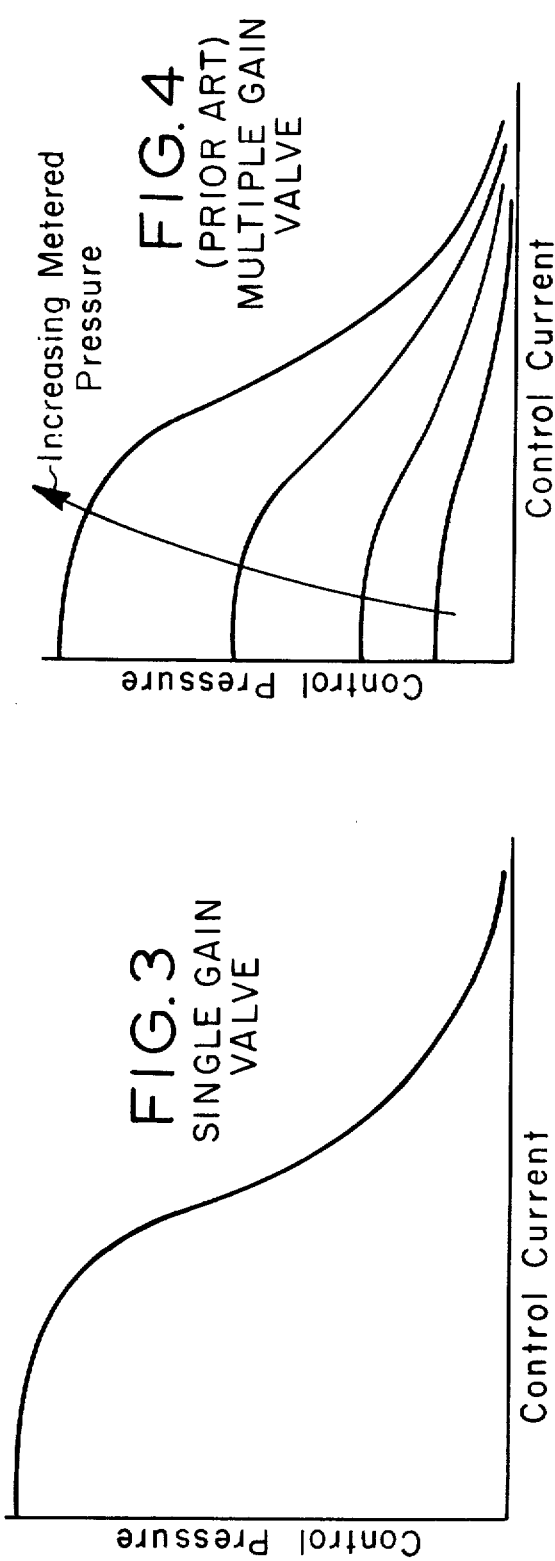

SINGLE GAIN SKID CONTROL VALVE AND SKID CONTROL SYSTEM

BACKGROUND OF THE INVENTION

The present invention is directed to a vehicle skid control system. Specifically, the subject invention is directed to a skid control system for controlling the brake pressure independently of an input metered pressure when the input metered pressure is in excess of a predetermined control pressure, which predetermined threshold pressure is generated by the control valve in response to a control signal generated by the skid control circuitry of the system.

A vehicle skid control system generally includes a servovalve which operates in two modes: a metered pressure mode in which the input metered pressure is not above a predetermined control pressure; and a skid control mode in which the input metered pressure exceeds the predetermined control pressure. In the metered pressure mode, the metered pressure is applied directly to a brake port. An input control signal to the skid control valve determines the control pressure and in the event the input metered pressure exceeds the contol pressure, the skid control valve controls the brake port pressure in response to the input control signal. Since in the skid control mode an input control signal controls the brake port pressure, the gain of a skid control valve can be defined as the changed in brake pressure which results from a given change in control signal level. Generally, in skid control operation brake pressure follows the control pressure and a skid control valve can also be evaluated in terms of control pressure generated in response to a current control input.

Prior art skid control systems include fixed gain as well as variable gain type valves. However, these prior art systems had the disadvantage of having a different pressure control-signal level relationship for a given metered pressure input. That is, the brake pressure output in the skid control mode of operation would depend upon the control signal level as well as the input metered pressure. As a result, skid control effectiveness is diminished because of the effect variation of input metered pressure has upon the brake pressure applied in response to a particular control input signal.

Some of the disadvantages of such prior art systems include the tendecy to release excessive brake pressure and great sensitivity of the brake pressure applied to control signal changes at low brake pressures. As noted above, sensitivity to input metered pressure variation is also an important disadvantage.

These prior art systems include skid control valves which generate a control pressure in response to the control signal and have the metered input pressure as the source of supply pressure for generating the control pressure. Therefore, in addition to the metered input pressure dependence discussed above, brake pressure reapplication is delayed because of flow drop across the pressure metering valve during pressure recovery.

It is therefore an object of the subject invention to provide an improved skid control system.

A further object of the present invention is to provide an improved skid control system having a control valve which operates independently of input metered during skid control and thereby provides a single gain response characteristic in the skid control mode.

Still another object of this invention is to provide a skid control system having a valve which generates a predetermined control pressure for comparison with an input metered pressure.

A further object of the present invention is to provide an improved skid control systm in which valve brake port pressure is controlled independently of input metered pressure whenever the metered pressure is in excess of a predetermined control pressure.

Another object of the present invention is to provide a skid control valve having rapid pressure reapplication which is insensitive to the input metered pressure.

SUMMARY OF THE INVENTION

The foregoing objects and features are achieved by the disclosed skid control system by providing a two-stage control valve wherein the first stage is a hydraulic amplifier for producing a control pressure in response to an input control current and wherein the second stage is a pressure follower stage for controlling hydraulic pressure applied to at least one brake port in response to the pressure difference between the control pressure and a metered supply pressure. The supply pressure for the first stage is obtained from a substantially constant pressure source of hydraulic power and is independent of the metered supply pressure variations. The substantially constant pressure source therefore allows the control pressure to be independent of metered supply pressure variations.

One disclosed control valve includes one first stage and one second stage for controlling a single wheel. Another disclosed control valve includes a first stage and a dual control second stage for the differential braking of a pair of wheels. The dual control second stage includes two independent metered supply pressure inputs which are compared to the same control pressure.

BRIEF DESCRIPTION OF THE DRAWING

The foregoing and other objects, features and advantages of the present invention will be readily apparant to one skilled in the art from the following detailed description when read in conjunction with the drawing wherein:

FIG. 1 is a cross-section view of a single wheel control valve of the present invention FIG. 2 is a cross-section view of a paired wheel control valve of the present invention for use with paired wheels.

FIG. 3 is a graph of the control pressure-control current characteristic of the skid control system of the subject invention.

FIG. 4 is a graph of a family of control pressure-control current characteristics of a prior art variable gain skid control systems for various fixed metered pressure values.

FIG. 5 is a system diagram of the major components of a skid-control system embodying the skid control system of the present invention.

DETAILED DESCRIPTION OF THE DISCLOSURE

The skid control valves of the present invention will initially be described in terms of the particular embodiments disclosed in FIGS. 1 and 2; and the skid control system of the present invention shown in FIG. 5 will be described in conjunction with the single wheel skid control valve of FIG. 1. A description of the skid control valves of FIGS. 1 and 2 facilitates the description of the skid control system of FIG. 5.

As noted above, FIG. 1 discloses a skid control valve 10 for use in control a single wheel of a vehicle. The single wheel control valve 10 includes a permanent magnet torque motor indicated by the reference numeral 20 which can be generally described as a motor for converting an electrical input signal to a mechanical position which is a function of the input electrical signal level. The torque motor 20 includes a motor cover 11 for protecting the internal element of the motor 20 and input terminals 13 for accepting an electrical control current. A cylindrical-shaped magnet 15 having a pair of opposing, inwardly extending pole sections 15A are provided for producing a constant flux. The pole sections 15A are located on the cylinder ends of the magnet 15 in radially opposite positions and extend only through small arc portions of the cylinder ends. A fluid barrier 17 surrounds an armature 19 which is exposed to hydraulic fluid while the other elements on the other side of the fluid barrier 17 are isolated from the hydraulic fluid. The fluid barrier 17 is dimensioned to allow sufficient movement of the armature 19. A coil 21 is wound around the fluid barrier 17 and is connected to the input leads 13 for producing a variable flux in the air gaps between the pole sections 15A. The armature 19 is pivotly suspended by a spring suspension 23 for pivotal displacement in response to the variation in flux caused by the input current applied to the input terminals 13. The armature 19 terminates in a flapper 25, the position of which is a function of the input current applied to inpur terminals 13.

The skid control valve 10 includes a first stage designated with the reference numeral 30 for generating a control pressure and includes a control chamber 27 into which the flapper 25 extends. A supply pressure port 29 is provided for accepting substantially constant pressure from a constant pressure source external to the skid control valve 10. A port filter 31 is provided for preventing the entry of contaminants into the internal structure of the skid control valve 10. A supply nozzle 33 is in communication with the supply port 29 via a supply channel 35. The supply nozzle 33 has its tip opening adjacent one side of the flapper 25 and is appropriately positioned to close off the tip of the supply nozzle 33 when completely displaced toward the nozzle 33. On the other side of 25 and opposite the supply nozzle 33 is a return nozzle 39 for returning the hydraulic fluid brought into the control chamber 27 through the supply pressure nozzle 33. The return nozzle is also positioned to be closed off by the flapper 25 when it is completely displaced toward the return nozzle 39. Both nozzles 33 and 39 cooperate with the flapper 25 for controlling the hydraulic pressure within the control chamber 27 in response to input control current signals applied to the input terminals 13. As the input control current level is varied, the armature 19 is pivotly displaced about the spring suspension 23 and therefore varies the position of the flapper 25 with respect to the nozzles 33 and 39. This changes the flow rate through the control chamber 27 and thereby changes the pressure within the control chamber. For example, as the flapper 25 is displaced towards the return nozzle 39 return flow through the return nozzle 39 is reduced and therefore the hydraulic flow through the control chamber 27 is reduced. This results in an increase of pressure within the control chamber 27. Completely closing off the return nozzle 29 results in a control pressure in the control chamber which is equal to the supply pressure applied at the supply port 29. Maintaining the flapper 25 in a fixed position by applying a fixed current input also fixes the pressure within the control chamber 27.

From the foregoing it is readily seen that the torque motor 20 cooperates with the first stage 30 to generate a control pressure within the control chamber 27 which is a function of the input control current applied to the input terminals 13. The control pressure generated within the control chamber 27 is applied to a second stage 40 of the control valve 10 via a control pressure channel 41.

The second stage 40 includes a metered pressure input port 43 through which variable metered pressure is applied to the control valve 10. A filter 45 is provided at the external opening of the metered pressure port 43. The metered pressure port is in communication with a valve chamber 47 in which a spool valve 49 is slideably fitted. A brake pressure port 51, which has a filter 53 at its external opening, is also in communication with the valve chamber 47 and is externally connected to the hydraulic braking system of a wheel. A return port 55 is provided for the return nozzle 39 of the first stage 30, which return nozzle is also in communication with the valve chamber 47 via a return channel 57. The spool valve 49 includes a metering spool 59 at one end and a return spool 61 at the other ends. The intermediate portion of the spool valve 49 is narrower than the spools 59 and 61 and the dimensions of the spool valve 49 are chosen in such a manner that there is only one position wherein both the metered pressure port 43 and return port 55 are shut off by metering spool 59 and the return spool 61, respectively. In any other position, the brake port 51 will be open to either the metered pressure port 43 or the return port 55 but the brake port 51 cannot be open to both metered pressure and return ports. The portion of the valve chamber 47 in the vicinity of the brake port 51 includes an annular extension of the valve chamber 47 for maximizing the flow between the metered pressure port 43 and the brake port 51. The spool valve 49 includes a pressure equalizing channel 57 for maintaining the pressure in that portion of the valve chamber 47 on the open side of the metering spool 59 at the same pressure as the pressure at the brake port 51. This causes the brake port pressure to be applied to a brake pressure surface 63. An annular extension is also provided in that portion of the valve chamber which is in the vicinity of the return port 55 to insure that the return port is always open to return pressure present in the return channel 57 which is in communication with the return nozzle 39. The control pressure generated in the control chamber 27 is applied to a control surface 65 on the free end the spool 61 through a control pressure input port 67 which is connected to the control pressure channel 41.

The operation of the single wheel skid control valve is as follows. The permanent magnet 15 and the coil 21 of the torque motor 20 are preferably structured in such a manner that with no control current input being applied to the input terminals 13, the flapper 25 is positioned against the tip of the return nozzle 39 and thereby closes off a return path for the hydraulic fluid within the control chamber 27. This causes the control pressure within the control chamber 27 to be equal to the supply pressure being applied at the supply port 29. Therfore, with no control current input, the pressure being applied to the control pressure surface 65 is equal to the constant supply pressure being applied to the metered pressure port 43. The spool valve 49 will therefore remain in its leftmost position and the skid control valve 10 will operate in a metered pressure mode wherein brake port pressure will be equal to the metered pressure.

With this particular relationship between input current and control pressure, a control pressure lower than supply pressure will be generated in the control chamber 27 only when an input is applied to the input terminals 13. When an input control current is applied to the input terminals 13, a control pressure less than the constant supply pressure will be generated in the control chamber 27 because the flapper 25 will be caused to move toward the supply nozzle 33. This control pressure generated in response to the control current input represents a predetermined threshold pressure which the skid control circuitry providing the input for the skid control valve 10 has determined to be the maximum pressure which should be applied to the brake port 51 in order to prevent skid conditions. When such a control pressure is generated, the brake port 51 will be open to the metered pressure being applied to the metered pressure port 43 as long as the metered pressure does not exceed the control pressure. However, if the metered pressure equals or exceeds the control pressure and causes the brake port pressure to equal or exceed the control pressure, the spool valve 49 will act as a pressure follower for maintaining the brake port pressure at approximately the same pressure as the control pressure. When the spool valve acts as a pressure follower, the skid control valve 10 is operating in a skid control mode in which the pressure in the brake port 51 is controlled by the control pressure independently of the metered pressure as long as the metered pressure exceeds the control pressure.

The pressure follower function of the second stage 40 occurs because the spool valve 49 is displaced within the valve chamber 47 as a function of the pressures applied to the brake pressure surface 63 and the control pressure surface 65. The metered pressure mode is maintained whenever the brake port 51 pressure is maintained at a level which is less than the pressure from the control chamber 27 which is being applied to the control pressure surface 65. During metered pressure mode operation, the spool valve 49 is positioned to the left, thereby maintaining the brake port 51 open to the pressure that is present in the metered pressure port 43. As long as the metered pressure applied to the metered pressure port 43, which controls the pressure in the brake pressure port 51, is maintained at a level less than the control pressure being applied to the control pressure surface 65, the spool valve 49 will maintain its leftmost position and thereby allow the metered pressure to control the brake port pressure.

The skid control mode of operation of the skid control valve 10 is initiated whenever the brake port pressure exceeds the control pressure. This may be brought about by an input metered pressure applied to the metered pressure port 43 which is greater than the control pressure or by a decrease in the control pressure in response to a change in the control current applied to the input terminals 13. Because of the greater pressure being applied to the brake pressure surface 63, the spool valve 49 will move to the right and thereby shut off the metered pressure port 43 because of the location of the metering spool 59. The spool valve 49 will move further to the right and thereby open the return port 55 for the release of brake port pressure while maintaining the metered pressure port 43 closed. The return port 55 is maintained open with respect to the valve chamber 47 for as long as the brake port pressure is in excess of the control pressure being applied to the control pressure surface 65. When the brake port pressure an the control pressure are approximately equal, the spool valve will attain an equilibrium position in which both the metered port 43 and the return pressure port 55 are shut off by the spools 59 and 61, respectively.

From the foregoing it can be seen that as long as the brake port pressure is equal to or greater than the control pressure, the spool valve 49 will function so as to maintain the brake port pressure approximately equal to the control pressure. When the control pressure applied to the control pressure surface 65 is caused to increase above the brake port pressure, the spool valve will be displaced to the left and thereby open the metered pressure port 43 to the brake port 51. The equilibrium position of the spool valve 49 will also be achieved when the input metered pressure applied to the metered pressure port 43 causes the brake port pressure to equal a control chamber pressure being applied to the control pressure surface 65. The reason for this is that the brake pressure surface 63 is responsive to the feedback pressure which is fed back to the valve chamber 47 when the brake port is pressurized to the pressure present in the metered pressure port 43.

The above described structure including the torque motor 20 and the first stage hydraulic amplifier for generating a control pressure which decreases as current increases is a system well suited for skid control because a skid control circuit will generally be designed to have a zero output when no incipient skid conditions are sensed. Therefore, when no skid condition is sensed, the control pressure in the skid control valve 10 is equal to the constant supply pressure. When skid conditions are sensed, a current signal will be applied to the input terminals of the control valve 10 which causes the control pressure to decrease and thereby control the maximum alowable brake pressure. Removal of the control current in response to non-skid conditions return the control pressure to supply pressure; and the control valve 10 thereby insures that during non-skid conditions the brake port 51 is always open the metered pressure applied to the metered pressure port 43.

FIG 2 illustrates a single gain skid control valve 50 for use with a paired set of wheels. The skid control valve 50 is very similar in structure to the skid control valve 10 illustrated in FIG. 1 with the differences being in the structure of a second stage 60 of the skid control valve 50 of FIG. 2. Therefore, the same reference numerals with the addition of primes will be used in FIG. 2 with respect to the other portions of the skid control valve 50, which are essentially the torque motor 20' and the first stage hydraulic amplifier 30'. Therefore, the corresponding elements of the torque motor 20' and the first stage 30' shown in FIG. 2 will not be described.

Because of the similarity between the elements of the second stage 40 of FIG. 1 and the second stage 60 of FIG. 2, the correspondingly similar elements in FIG. 2 will be numbered with the same numerical designation plus the additional designation of a "L" or "R" to distinguish between the left and right valve assemblies of the second stage 60 of the dual wheel skid control valve 50 shown in FIG. 2. It will be noted that although the filters in the pressure ports shown in FIG. 1 have been eliminated from FIG. 2, such filters will be used in practicing the invention in order to avoid contamination failures of the internal components of the skid control valves illustrated in FIGS. 1 and 2.

The operation of the dual wheel skid control valve 50 can be described as follows. The control pressure channel 41' bifurcates into two channels for application of the control pressure generated within the control chamber 27' to each of the control pressure ports 67L and 67R. An interconnecting return channel 56 is interposed between the return pressure opening of the valve chambers 47L and 47R to allow the return pressure to flow out of the skid control valve 50 through the return port 55'. When no input control current is being applied to the input terminals 13', the control pressures applied to the control pressure surfaces 65L and 65R are equal to the supply pressure being applied to the supply port 29'. In this zero current condition, the spool valves 49L and 49R operate in the metered pressure mode in which the pressures in the brake ports 51L and 51R follow the input metered pressures being applied to the metered pressure ports 43L and 43R, respectively. When an input control current is applied to the input terminals 13', the control pressure generated within the control chamber 27' and applied to the control surfaces 65L and 65R will be less than the constant supply pressure and could be exceeded by the metered pressure inputs to the metered pressure ports 43L and 43R. If one of the metered pressures applied to the metered pressure ports 43L and 43R exceeds the particular controlled pressure generated in the control chamber 27', the spool valve corresponding to the particular metered pressure port receiving the excessive pressure will operate in the control pressure mode as described above with respect to the single wheel skid control valve 10 shown in FIG. 1. Briefly, the spool valve to which excessive metered pressure has been applied will modulate the brake port pressure in accordance with the control pressure being generated in response to the input control current applied to the terminals 13'. In such a situation where only one of the input metered pressures is above the control pressure, the spool valve which has a metered pressure applied to it which is less than the control pressure will continue to operate in the metered pressure mode and the brake port pressure will follow the input metered pressure as long as the input metered pressure is less than the control pressure in the control chamber 27'. In essence, the pressures at the brake ports 51L and 51R will follow either the corresponding input metered pressures being applied to the metered pressure ports 43L and 43R, respectively, or the control pressure, depending on which pressure is lower. Of course, if both metered pressures being applied are above the control pressure, differential braking is not available because the pressures at the brake ports 51L and 51R will be modulated and controlled in accordance with the same control pressure. If one input metered pressure should go below the control pressure, the corresponding spool valve will be displaced downwardly to allow the input metered pressure to control the brake port pressure.

The advantages in the skid control operation of the skid control valves 10 and 50 can be illustrated by a comparison of the control pressure vs. current characteristics of the single gain skid control valves 10 and 50 and a prior art multiple gain skid control valve. FIG. 3 shows the control pressure generated by a single gain skid control valve in response to a control current input. The curve of FIG. 3 is applicable for any input metered pressure. FIG. 4 is a family of curves showing the control pressure generated by the prior art multiple gain valve wherein each curve is the control pressure — control current characteristic for a fixed metered pressure. As shown in FIG. 4, the control pressure generated in response to a fixed control current increases with increasing metered pressure. The curves of FIGS. 3 and 4 clearly show that the single gain skid control valve of the present invention generates a control pressure which is completely independent of the metered pressure applied to the skid control valve. This results in skid control mode operation in which the brake pressure is controlled exclusively by the control current in accordance with the graph of FIG. 3 as long as the metered pressure is above the control pressure; and variations in metered pressure have no effect on the skid control mode brake pressure as long as the metered pressure remains above the control pressure. In contrast, the prior art multiple gain valve will generate in response to a fixed control current a control pressure which depends upon the metered pressure. Therefore, variations in metered pressure will affect the brake pressure when the prior art skid control valve modulates brake pressure in accordance with the control pressure.

The paired wheel skid control valve 50 of FIG. 2 also generates a control pressure which is a function of control current as shown in FIG. 3. If both metered pressures are below the control pressure, the brake port pressure will follow the corresponding metered pressures. When one metered pressure exceeds the control pressure, the corresponding second stage spool valve will cooperate with the control pressure to modulate the corresponding brake port pressure in accordance with the curve of FIG. 3 as long as the metered pressure remains above the control pressure. During the condition when both metered pressures exceed the control pressure, both brake port pressures will be controlled in accordance with the curve of FIG. 3 since the same control pressure will be applied to both spool valves as long as both metered pressures remain above the control pressure. Thus, when both brake ports are being controlled by the control pressure, both are modulated to substantially the same pressures; and variations in metered pressures have no effect on brake port pressures.

It should be emphasized that the brake port pressure will not follow the control pressure curve if the metered pressure is less than the control pressure even in the presence of a skid control current input. In the absence of a skid control current input, the control pressure is equal to the supply pressure. The curve of FIG. 3 can also be described as a graph of the maximum allowable brake port pressure as a function of control current.

The skid control valves are for use in a skid control system 100 as shown in FIG. 5. The skid control system 100 illustrates the use of the single wheel skid control valve 10 shown in FIG. 1 and described above.

The skid control system 100 includes a wheel speed transducer 101 which senses wheel speed and generates an electrical signal representative of wheel speed for application to a skid control circuit 103. The skid control circuit 103 performs various operations on the wheel speed signal and generates a voltage control signal, the level of which will generally represent a threshold skid pressure. An example of such a skid control circuit 103 is disclosed in U.S. Pat. No. 3,768,873, issued on Oct. 30, 1973. A valve driver 105 accepts the voltage control signal from the skid control circuit 103 and generates a current control signal which is a function of the input voltage control signal and is therefore also representative of a threshold skid pressure. The current type valve driver 105 is utilized because the skid control valve 10 is a current controlled servovalve.

The hydraulic elements of the skid control system 100 include the skid control valve 10 disclosed in FIG. 1 which is adapted to accept substantially constant hydraulic pressure source 107. Interposed between the supply port 29 and the constant pressure source 107 is an on-off pressure valve 109 for selectively allowing or preventing the application of hydraulic pressure valve control 111. Such selective application of pressure to the skid control valve 10 is desirable to avoid unnecessary supply pressure application under conditions when braking is not necessary. This relief of pressure prevents undesirable leakage within the valve. For example, in a skid control system for an airplane, the on-off pressure valve 109 can be used to prevent the application of supply pressure to the skid control valve 10 whenever the landing gear is in the up position. Of course, it would also be possible to regulate the application turning the constant pressure source 107 on or off.

As discussed above in conjunction with FIG. 1, the skid control valve 10 provides for the application of brake pressure to a brake cylinder 113 from the brake 53. The brake port pressure is controlled by the skid control valve 10 to follow either the metered pressure applied to the metered pressure port 43 from a pressure metering valve 115 or the control pressure generated by the skid control valve 10 in response to the current control signal. Although not shown, the pressure metering valve 115 can obtain its supply pressure from the constant pressure source 107. The return port 55 is appropriately connected to hydraulic apparatus for relieving pressure which may also be connected to the pressure supply source 107 for recirculation of hydraulic fluid.

Although the foregoing has been a description of specific embodiments of the invention, it will be apparent to one skilled in the art that various changes and modifications can be made without departing from the scope and spirit of the invention as defined by the following claims.

What is claimed is:
1. A vehicle skid control system comprising:
a skid control circuit including a valve driver for providing a skid control signal;
means for providing a supply of hydraulic fluid at substantially constant pressure;
means for providing hydraulic fluid at variable metered pressure;
control pressure generating means having a constant pressure supply port for accepting said constant pressure hydraulic fluid and for providing a control pressure in response to said skid control signal, said control pressure being exclusively controlled by said skid control signal and having a level which is a predetermined function of said skid control signal; and
brake pressure valving means responsive to said metered pressure and said control pressure for comparing said metered pressure with said control pressure and for producing a brake output pressure which is determined by the lower of either of said metered pressure or control pressure.

2. The vehicle skid control system of claim 1 wherein said control pressure is an inverse function of the magnitude of said skid control signal.

3. The vehicle skid control system of claim 2 wherein said brake pressure valving means includes an input port for receiving said metered pressure hydraulic fluid, a control pressure port for receiving said control pressure, and a brake port for providing said determined output pressure.

4. The vehicle skid control system of claim 3 wherein said brake pressure valving means further includes pressure balancing means for allowing said input port to be in communication with said brake port when said metered pressure is less than said control pressure and for closing said input port from said brake port and controlling said brake output pressure with said control pressure when said metered pressure exceeds said control pressure.

5. The vehicle control system of claim 4 wherein said pressure balancing means comprises a spool valve having control surfaces acted upon by said control pressure and said brake output pressure.

6. The vehicle skid control system of claim 1 wherein said control pressure generating means comprises:
a control chamber;
means for introducing said constant pressure hydraulic fluid into said control chamber;
means for releasing hydraulic fluid from said control chamber and for allowing fluid flow within said control chamber; and
fluid flow control means responsive to said skid control signal for cooperating with said hydraulic fluid introducing means and said hydraulic fluid releasing means for controlling the fluid flow in said chamber as a predetermined function of the skid control signal.

7. The vehicle skid control system of claim 6 wherein said hydraulic fluid introducing means is a nozzle in communication with said constant pressure supply port and having its tip opening within said chamber and wherein said hydraulic fluid releasing means comprises a second nozzle having its tip opening within said chamber and opposite the tip opening of said first nozzle.

8. The vehicle skid control system of claim 7 wherein said fluid control means comprises:
a displaceable flapper interposed between the tip openings of said first and second nozzles; and
a motor for displacing said flapper in a predetermined manner between the tip openings of said first and second nozzles in response to the skid control signal.

9. A vehicle skid control system comprising:
a skid control circuit including a valve driver for providing a skid control current signal;
a source of substantially constant pressure hydraulic fluid;
a pressure metering valve for providing hydraulic fluid at a pressure which is metered by the vehicle operator;
control pressure generating means having a constant pressure supply port for accepting said constant pressure hydraulic fluid and for providing a control pressure in response to said skid control current, said control pressure being exclusively controlled by said skid control signal and having a level which is inversely proportional to the magnitude of said skid control current signal; and brake pressure valving means having an input port for accepting said metered pressure fluid, a brake port for providing hydraulic fluid at brake port pressure, a hydraulic return port, and a control pressure port for accepting said control pressure, said brake pressure valving means including a pressure balancing spool valve operative to cause said brake port pressure to be modulated by said metered pressure when said metered pressure is below said control pressure and to cause said brake port pressure to be modulated by said control pressure independently of variations in said metered pressure when said metered pressure is above said control pressure, thereby providing a single gain valving response characteristic when said control pressure is modulating the brake port pressure.

10. The vehicle skid control system of claim 9 wherein said control pressure generating means comprises:
- a control chamber;
- means for introducing said constant pressure hydraulic fluid into said control chamber;
- means for releasing hydraulic fluid from said control chamber and for allowing fluid flow within said control chamber; and
- fluid flow control means responsive to said skid control current signal for cooperating with said hydraulic fluid introducing means and said hydraulic fluid releasing means for controlling the fluid flow in said chamber as a predetermined function of said skid control current signal.

11. The vehicle skid control system of claim 10 wherein said hydraulic fluid introducing means is a first nozzle in communication with said constant pressure supply port and having its tip opening within said chamber and wherein said hydraulic fluid releasing means comprises a second nozzle having its tip opening within said chamber and opposite the tip opening of said first nozzle.

12. The vehicle skid control system of claim 11 wherein said fluid control means comprises:
- a displaceable flapper interposed between the tip openings of said first and second nozzles; and
- a motor for displacing said flapper in a predetermined manner between the tip openings of said first and second nozzles in response to said skid control current signal.

13. A skid control valve responsive to a variable skid control signal, comprising:
- control pressure generating means for providing a hydraulic control pressure in response to the skid control signal, said control pressure being exclusively controlled by the skid control signal and having a level which is a predetermined function of the skid control signal; and
- brake pressure valving means for accepting a metered hydraulic fluid pressure and for comparing the metered pressure with said control pressure and for producing a hydraulic brake pressure which is determined by the lower of either said control pressure or said metered pressure.

14. The skid control valve of claim 13 wherein said control pressure is an inverse function of the magnitude of said skid control signal.

15. The skid control valve of claim 14 wherein said brake pressure valving means includes an input port for receiving the metered pressure hydraulic fluid, a control pressure port for receiving said control pressure, and a brake port for providing said determined brake output pressure.

16. The skid control valve of claim 15 wherein said brake pressure valving means further includes pressure balancing means for allowing said input port to be in communication with said brake port when said metered pressure is less than said control pressure and for closing said input port from said brake port and controlling said brake output pressure with said control pressure when said metered pressure exceeds said control pressure.

17. The skid control valve of claim 16 wherein said pressure balancing means comprises a spool valve having control surfaces acted upon by said control pressure and said brake output pressure.

18. The skid control valve of claim 13 wherein said control pressure generating means comprises:
- a control chamber;
- means for accepting hydraulic fluid of substantially constant pressure and for introducing hydraulic fluid into said control chamber;
- means for releasing hydraulic fluid from said control chamber and for allowing fluid flow within said control chamber; and
- fluid flow control means responsive to the skid control signal for cooperating with said hydraulic fluid accepting means and said hydraulic fluid releasing means for controlling the fluid flow in said chamber as a predetermined function of the skid control signal.

19. The skid control valve of claim 18 wherein said hydraulic fluid accepting and introducing means includes a first nozzle having its tip opening within said chamber and wherein said hydraulic fluid releasing means comprises a second nozzle having its tip opening within said chamber and opposite the tip opening of said first nozzle.

20. The skid control valve of claim 19 wherein said fluid control means includes:
- a displaceable flapper interposed between the tip openings of said first and second nozzles; and
- a motor for displacing said flapper in a predetermined manner between the tip openings of said first and second nozzles in response to the skid control signal.

21. A method of controlling brake pressure for a wheel comprising the steps of:
- generating a variable skid control signal from wheel speed data;
- generating a control pressure which is exclusively controlled by the skid control signal and which has a pressure level which is a predetermined function of the skid control signal;
- comparing a metered pressure with the control pressure generated; and
- generating a brake pressure which is equal to the metered pressure if the metered pressure is less than the control pressure and which is equal to the control pressure if the metered pressure exceeds the control pressure.

22. The method of claim 21 wherein said step of generating a control pressure comprises the steps of generating a substantially constant hydraulic pressure and reducing the substantially constant pressure to a level which is determined by the level of the skid control signal.

* * * * *